M. ARNDT.
DEVICE FOR MAKING MEASUREMENTS BY MEANS OF FLOWING LIQUID.
APPLICATION FILED AUG. 6, 1906.

981,151.

Patented Jan. 10, 1911.

2 SHEETS—SHEET 1.

Witnesses
Jesse N. Lutton
R. Sommers

Inventor
Max Arndt
by Henry Orth
Atty

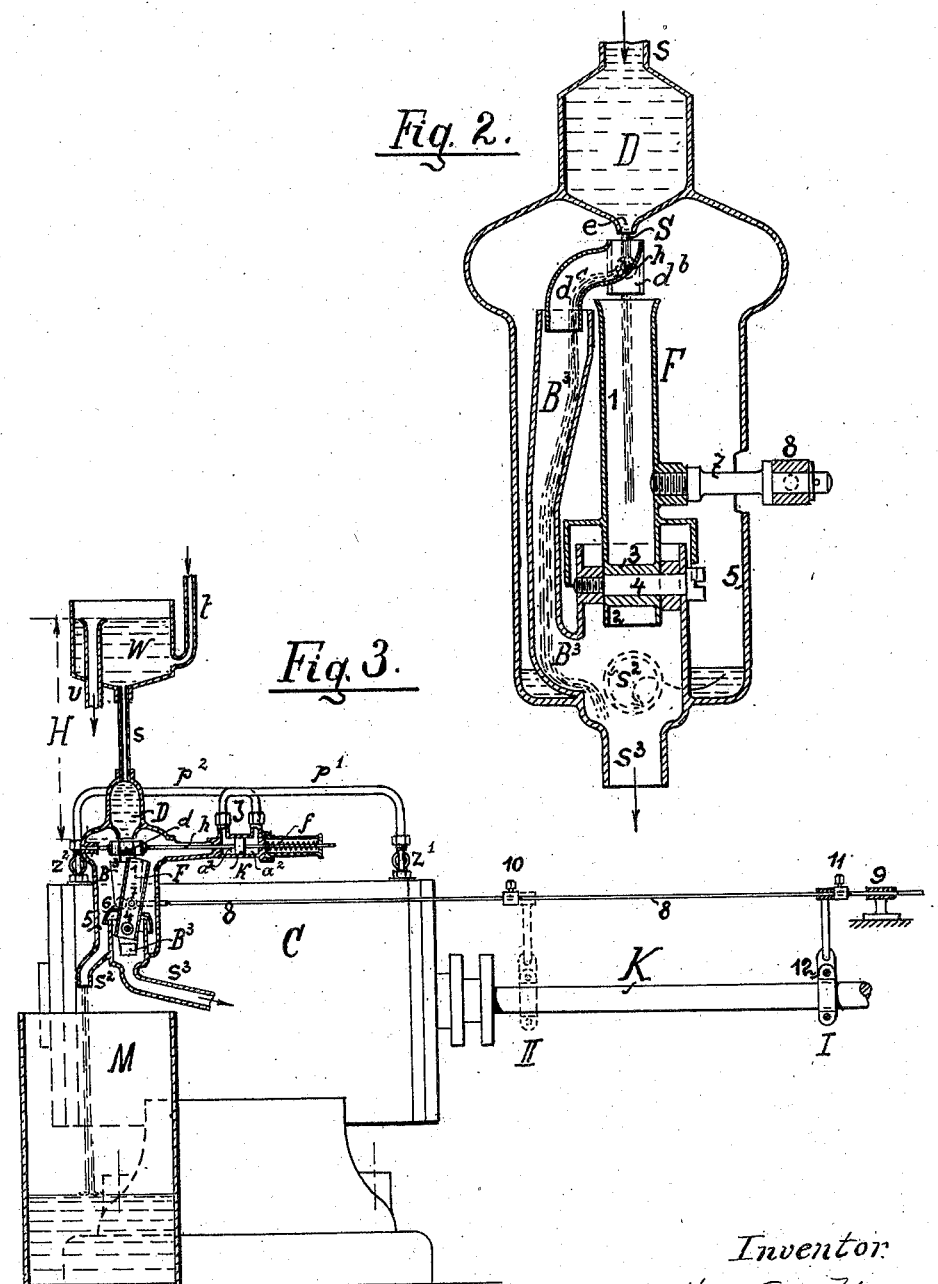

UNITED STATES PATENT OFFICE.

MAX ARNDT, OF AIX-LA-CHAPELLE, GERMANY.

DEVICE FOR MAKING MEASUREMENTS BY MEANS OF FLOWING LIQUID.

981,151. Specification of Letters Patent. Patented Jan. 10, 1911.

Application filed August 6, 1906. Serial No. 329,476.

*To all whom it may concern:*

Be it known that I, MAX ARNDT, a subject of the German Emperor, residing at the city of Aix-la-Chapelle, in the Kingdom of Prussia, German Empire, have invented certain new and useful Improvements in Devices for Making Measurements by Means of Flowing Liquid; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to apparatus by which measurements of any kind are made by cutting off quantities of a liquid from a continuously flowing stream of such liquid.

An important object is to carry out continuous, uninterrupted measurements by cutting off quantities of liquid with a separating device from a jet of liquid which constantly flows out freely with an always equal pressure, the separating device being guided by a part of the machine of which the motion or power is to be measured or indicated. The average movement which has taken place or the power delivered during the time of measurement, is determined by means of the quantity of liquid which has been cut off.

My invention consists in the combination of a device for delivering a uniform outflow of a liquid, and a device for cutting off a certain quantity of the liquid, the latter device being capable of being moved into the jet of liquid and of being divided into separate conduits or channels for the quantity of liquid which has been cut off and for the remaining liquid.

More particularly my present invention consists in a device for making measurements by means of liquids, and in order that the details of construction and operation of my said invention may be more clearly understood, reference is made to the accompanying drawings, in which like parts are similarly designated, and in which—

Figure 1:
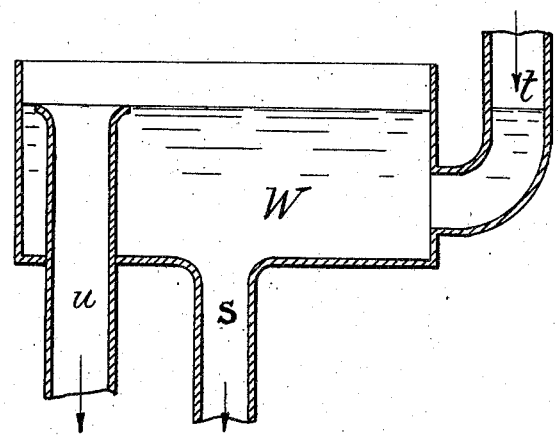
Figure 1:
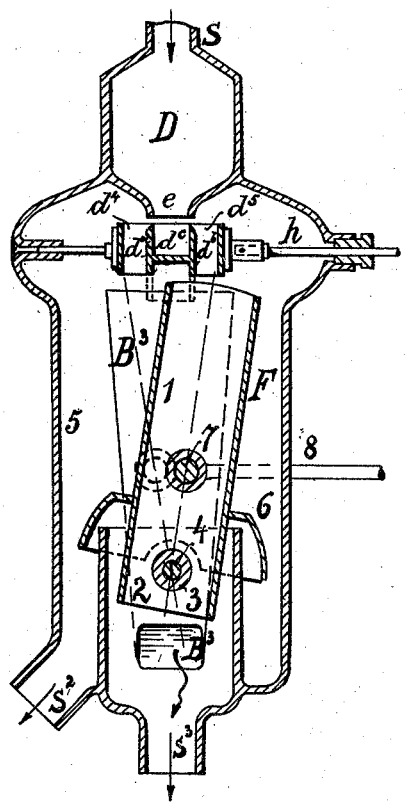

Figure 1 is a vertical central section through the device; Fig. 2 is a vertical central section of Fig. 1, and Fig. 3 is a view, partly in section, showing the device connected to a steam-engine for indicating the same.

In said drawings, W is a reservoir for a liquid, provided with a permanent or continuously open supply pipe $t$ and overflow pipe $u$ for maintaining a constant level of liquid, preferably water in the reservoir W. A pressure pipe $s$ goes from the reservoir W to the chamber D which is under the constant pressure of the column H of liquid, and which has below it the outflow nozzle $e$ for the jet S of the liquid to be measured.

By supplying to the reservoir W through the pipe $t$ a quantity of water or other liquid slightly in excess of that drawn off through $s$ there will be maintained, by reason of the overflow $u$, a constant hydraulic head H measured from the liquid level in W to the end of nozzle $e$.

The measuring device is formed for determining the average useful pressure or efficiency of a power machine having a piston, for example, a steam engine. For this purpose the connecting rod $h$ is connected with any well known form of indicator, and the latter is itself joined with both ends of the engine cylinder to be indicated.

As illustrated in Fig. 3, an indicator J is provided, having a piston $k$ in a cylinder $a^2$, said piston being on rod $h$ which is provided with the indicator spring $f$. The cocks $z'$ and $z^2$ are connected by pipes $p'$ and $p^2$ with the cylinder $a^2$. The rod 8 is mounted in a suitable bearing 9 and provided with adjustable stops 10 and 11 against which strikes the tappet 12 fastened to the piston K of the engine cylinder C. When the piston rod K travels from position I to position II, the dead points of the engine piston, the movable conduit 1 is suddenly reversed.

The separating device for the measuring liquid consists of two cut-off sides $d^a$ and $d^b$, the distance between the cutting edges of which is exactly equal to the clear width of the outflow opening $e$ or to the breadth of the jet of liquid. Emission channels $d^4$ and $d^5$ are arranged laterally of both of these cut-off sides $d^a$ and $d^b$, and between the latter is the channel $d^c$ turned backward into a fixed funnel $B^3$. The funnel $B^3$ discharges into the side of the outflow $s^3$ in such a way that all the liquid coming into it through the channel $d$ flows away through the pipe $s^3$.

The liquid flowing from the channel $d^4$ or from the channel $d^5$ may drop into a movable conduit 1, open above and below, and which is arranged under the liquid separating channels $d^4$, $d^5$, which conduit has a deflector 6 above its lower part 2, so that the liquid coming down at the sides of the conduit 1 in the receptacle 5 cannot get to the outflow $s^3$. Said conduit 1 is revoluble around pivot pin 4 passing through a sleeve 3. The conduit 1 may be displaced by means of a pin 7 and a rod 8 occasionally or alternately once in the one angular position and once in the other angular position, or, in other words, the conduit 1 is one time under the channel $d^5$ and at another time under the channel $d^4$ respectively.

When the cut-off sides $d^a$ and $d^b$ are in the position of rest, the whole jet of liquid S flows unhindered through the channel $d^c$ into the funnel $B^3$ and out at $s^3$. If, however, the separating device is displaced by the rod $h$ for example to the right, that portion of the jet separated by the cut-off side $d^a$ flows through the channel $d^4$ to the casing 5 and out of this through the pipe $s^2$ to a measuring device M for this quantity of liquid, it being taken for granted that the conduit 1 is in the right hand position. If, on the contrary, the separating device is displaced to the left, then the cut-off side $d^b$ separates a part of the jet of liquid, which likewise flows into the casing 5 and out of this through the pipe $s^2$, if the conduit 1 is displaced to the left.

Referring to Fig. 3, when the compression begins, steam under back pressure enters cylinder $a^2$ of the indicator to the right of the piston $k$, and boiler steam enters the cylinder $a^2$ on the left of the piston $k$ and the separating device is moved to the right, so that the wall $d^a$ will separate a portion of the stream of water issuing from $e$ and conduct it into conduit 1 and out at $S^3$. The conduit 1 is then reversed by rod 8 upon reversal of the stroke of the engine, and the back pressure is attained in cylinder $a^2$ to left of piston $k$ and boiler pressure on the right of piston $k$ when the separating device is so shifted that the wall $d^b$ separates water from the water issuing from $e$ and conducts this to conduit 1, and thence to $S^3$, so that only the effective pressure, as distinguished from back pressure and boiler pressure, will be indicated by water separated from the stream issuing from $e$ and conducted into chamber 5 and through $S^2$ into M.

I claim—

1. In a device for making measurements by means of a continuously flowing liquid, the combination of means adapted to form a constant jet of said liquid at constant pressure, means connected with apparatus to be indicated and moved by said apparatus into said jet, and means to conduct away liquid separated from said jet by said second means entering into the same, substantially as described.

2. In a device for making measurements by means of a continuously flowing liquid, the combination of means adapted to form a jet of liquid having constant speed and constant strength, a jet separating means adapted to be connected with apparatus to be indicated and adapted to be moved by said apparatus into said jet, and means adapted to conduct away liquid separated from said jet by said jet separating means by entering into the same, substantially as described.

3. In a device for making measurements by means of a continuously flowing liquid, the combination of means adapted to deliver a constant jet of said liquid at constant pressure, a plurality of jet separating passages having sharp upper edges and having openings in the bases adapted to be connected with apparatus to be indicated and adapted to be moved by said apparatus into said jet, and means adapted to conduct away liquid separated from said jet by said passages discharging into the same, substantially as described.

4. In a device for making measurements by means of a continuously flowing liquid, the combination of a reservoir (W) adapted to hold liquid, a supply pipe ($t$) and an overflow pipe ($u$) attached to the same, a pressure pipe ($s$) communicating with said reservoir whereby a constant jet of said liquid is formed; a jet separating device having sharp upper edges and having openings in its base adapted to be connected with apparatus of which the motion is to be measured and moved by said apparatus into said jet, a movable conduit under said jet separating device adapted to conduct away liquid directly therefrom when moved into said jet, substantially as described.

5. In a device for making measurements by means of a continuously flowing liquid, the combination of a reservoir (W) adapted to hold liquid, a supply pipe ($t$) and an overflow pipe ($u$) attached to the same, a pressure pipe ($s$) communicating with said reservoir whereby a constant jet (S) of said liquid is formed, a plurality of cut-off channels having sharp upper edges at their sides and having openings in their bases and being adapted to be connected with apparatus of which the motion is to be measured and adapted to be moved by said apparatus into said jet, a plurality of conduits under said cut-off channels adapted to conduct away liquid directly from said jet and from said channels when the same are moved into said jet, substantially as described.

6. In a device for making measurements by means of a continuously flowing liquid, the combination with means to supply a jet of liquid under a constant head; of means operated from the apparatus to be indicated to divert a portion of said jet, and means movable by the apparatus to be indicated into said jet to conduct the jet into a separate channel.

7. In a device for making measurements by means of a continuously flowing jet of liquid, the combination with means to supply a jet of liquid under a constant head, of a receptacle, a pivoted conduit therein, and a jet separating device, both moved from the apparatus to be measured, said pivoted conduit moved under the jet separating device at intervals to conduct the jet into a separate channel from the receptacle.

In testimony that I claim the foregoing as my invention, I have signed my name in presence of two subscribing witnesses.

MAX ARNDT.

Witnesses:
 WILLIAM J. REUTERS,
 HENRY QUADFLIEG.